Sept. 23, 1952          L. S. MANN          2,611,364
COLOSTOMY BELT
Filed Nov. 23, 1951
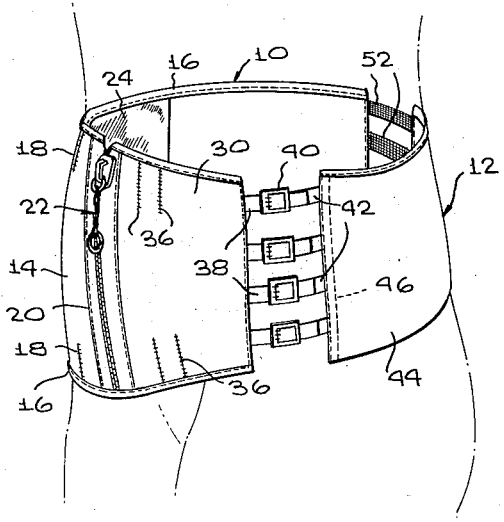
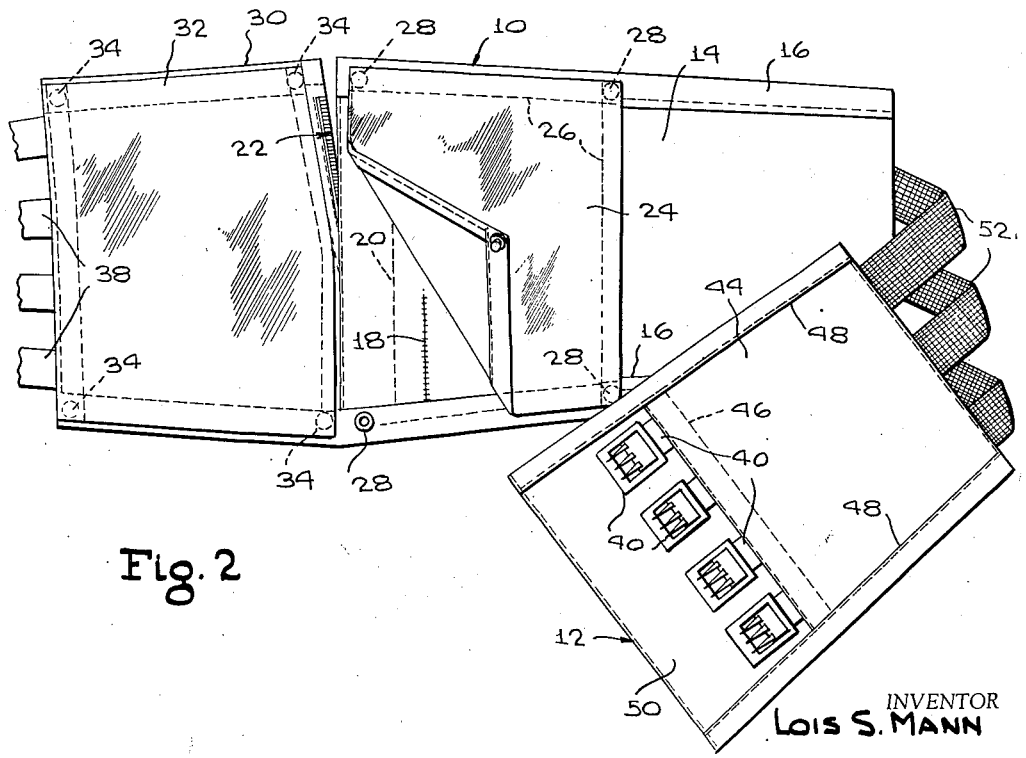
INVENTOR
Lois S. Mann
BY
McMorrow, Berman + Davidson
ATTORNEYS Patented Sept. 23, 1952

2,611,364

UNITED STATES PATENT OFFICE 2,611,364

COLOSTOMY BELT

Lois S. Mann, Waterville, Vt.

Application November 23, 1951, Serial No. 257,802

5 Claims. (Cl. 128—283)

This invention relates to a colostomy belt, adapted for use after performance of the surgical operation commonly known as a colostomy.

It is well appreciated by those handicapped by a colostomy operation that the belts, bands and other devices used for retention of the fecal discharge represent a substantial inconvenience, while still not discharging their intended function with desired efficiency.

In this connection, those colostomy belts of which I have knowledge are in general so designed as to make access to the excrement-absorbing pads or layers difficult. As a result, it is not uncommon that one wearing a colostomy belt of conventional design will require a private room in which to undress and remove the belt entirely. Further, these and other devices of which I have knowledge in many instances require the use of hot water, soap, disinfectant, and the like, in addition to a private location in which to undress and make a change of the colostomy belt or the pads carried thereby.

In many instances, of course, it is difficult to have access to a private facility such as has been referred to above, and in such cases, the wearer is often subjected to contaminating and unsanitary effects of the fecal discharge for an undesirably long period of time.

The main object of the present invention, accordingly, is to provide a colostomy belt which will, in the first instance, be comfortable and light when worn, and which will at the same time discharge its intended function with an efficiency which has not, to my knowledge, been the case with respect to previous belts for the same purpose.

A further important object of the invention is to provide a belt for the function stated which will be so designed as to permit the absorption pad or pads to be removed and changed without the necessity of the belts being removed entirely from the person, and also without the requirement of the wearer's undressing fully to cleanse his person of the fecal discharge and make the necessary belt change.

Yet another important object is to provide a colostomy belt as stated which will be so designed as to permit discharge absorption pads to be carried thereby without being noticeable, though formed to a greater thickness than would otherwise seem possible, the belt being so constructed, in this regard, as to have a fullness intermediate its top and bottom edges adapted to receive a pad of greater thickness than usual.

Yet another important object is to provide a colostomy belt of the type stated having incorporated therein removable, water-proof, sanitary linings of plastic or similar material, which can be readily detached from the belt without removal of the belt from the body of the wearer, and can be swiftly rinsed off and returned to their previous positions.

Still another important object is to provide a colostomy belt as described which is specifically adapted for carrying pads of toilet tissue, gauze, or the like, and which will permit said pads to be disposed of and replaced with maximum ease and facility when soiled by the fecal matter.

Other objects will appear from the following description, the claims appended thereto, and from the annexed drawing, in which like reference characters designate like parts throughout the several views, and wherein:

Figure 1 is a perspective view of a colostomy belt formed in accordance with the present invention as it appears when being worn, the dotted lines indicating a portion of the body of the wearer; and Figure 2 is an enlarged elevational view of the colostomy belt as it appears when viewed from its back, or inner surface, portions being broken away.

Referring to the drawings in detail, it will be understood at the outset that the colostomy belt, as is customary, comprises a plurality of panels of fabric or other flexible material, and preferably, the material of which the panels are composed is of a double thickness, while still being sufficiently light to assure comfort and sufficiently strong to assure long life.

In any event, the preferred example of the invention illustrated in the drawings includes a pair of panels generally designated 10 and 12, the panel 10 being of substantially greater size than the panel 12 and constituting a front panel, while the panel 12 may be conveniently termed a side panel. The front panel, in fact, is of such a length as to extend not only across the front of the abdomen, but also around one side of the wearer's body.

The front panel will first be described, and comprises a panel member 14 of approximately rectangular, elongated configuration. The panel member 14, as may be readily noted from Figure 2, is preferably slightly tapered from its inner to its outer end, but it is not essential that this tapered formation be imparted to the panel member during the construction of the colostomy belt.

The body portion of the panel member 14 is, as mentioned above, formed of a suitable fabric or other flexible material, which may be of single or double thickness as desired, and to prevent fraying of the top and bottom edges of the panel member, the panel member is bound, as at 16.

For the purpose of imparting a relative fulness to the portion of the panel member disposed intermediate the top and bottom longitudinal edges thereof, darts 18 are provided, extending inwardly from said top and bottom edges and spaced at desired locations longitudinally of the panel member. These darts impart a fulness to the panel member, so as to permit the panel member to receive absorption pads of toilet tissue, gauze or other disposable material, said pads being adapted to be formed to a somewhat greater thickness than is usually permitted, due entirely to the full formation of the panel member.

Extending from top to bottom of the panel member, along the wider inner edge of said member, is one portion 20 of a zipper fastener generally designated 22 or an equivalent fastening means. It is preferred that a separable fastener of the type illustrated be used, since this can be opened to selected extents, without completely separating the adjacent portions of the panel 10.

Secured to the inner surface of the panel member 14, and extending from the inner edge of the panel member to a location disposed approximately medially between the opposite ends of the panel member, is a waterproof, removable lining 24. This may be readily fashioned from plastic or similar material, but except as necessarily required by the scope of the appended claims, it is not desired that I be limited to such material.

In any event, the lining 24 is adapted to be interposed between an absorption pad, not shown, and the body portion of the panel. Should the lining member 24 become soiled by the fecal discharge, it can be removed readily, without removal of the colostomy belt from the person. The lining member, in this connection, is provided with a peripheral reinforcing hem 26, and carried by said hem, at the several corners of the lining member, are separable fasteners 28 which may be and preferably are the well known gripper fasteners having portions carried by the body of the panel 10, and cooperating portions carried by the lining member 24.

Also comprising a part of the front panel 10 is a panel member 30, approximately square in outer configuration, the panel member 30 being formed to substantially half the length of the panel member 14 that constitutes the other part of the front panel 10.

The panel member 30 is provided with a lining member 32 which in dimensions and shape is substantially identical to the panel member 30, as may be readily noted from Figure 2. The lining member 32 is also formed from plastic or similar material, and can be removed from its associated panel member with speed and facility, through the provision of fasteners 34 disposed at the several corners of said lining member and coacting with similar fasteners carried by the corner portions of the panel member 30.

The panel member 30, like the panel member 14, is provided with darts 36 extending inwardly from the top and bottom edges thereof, so as to impart to the panel member 30 a desired fulness.

Secured to the outer edge of the panel member 30 are horizontally disposed strap portions 38, equidistantly spaced from the top to the bottom edges of the panel member. The strap portions 38 are adapted to be extended into and be secured by buckles 40 carried by strap portions 42 extending horizontally from the side panel 12.

Considering the formation of the side panel 12, this is of approximately rectangular configuration, and includes a single panel member 44 of fabric or other flexible material having intermediate its respective ends a vertically disposed reinforcing strip 46. The reinforcing strip 46 has attached thereto the aforementioned strap portions 42, thus to prevent the strap portions 42 from becoming torn accidentally from the panel member 44.

Reinforcing the top and bottom longitudinal edges of the panel member 44 are hems 48 or suitable binding strips.

As may be noted, the strap portions 42 are disposed intermediate opposite ends of the panel member 44, so as to define between the reinforcing strip 46 and one end of the panel member 44 a flap 50, which can be folded under when the device is being worn, as may be readily noted from Figure 1.

Of course, the flap 50 need not necessarily be folded under when the colostomy belt is being worn, and can instead underlie the buckles 40, so as to be interposed between said buckles and the skin of the wearer's body.

Connecting the other end of the panel member 44 to the outer end of the panel member 14 are elastic connecting strips 52, spaced equidistantly from the top to the bottom edge of the colostomy belt. These strips 52 extend across the back of the wearer, so as to afford the wearer a high degree of comfort while the colostomy belt is being worn.

It may be readily appreciated that the belt can be applied to the wearer's body with considerable facility, and once in place, the belt need not be removed entirely, when it is necessary to remove an absorption pad or pads and replace the soiled pad with a clean one. Rather, it is merely necessary that the zipper fastener 22 be pulled open to the desired extent, after which the pad soiled by the fecal discharge can be removed easily and the contiguous portion of the wearer's body cleansed. A new pad can then be readily substituted, and the zipper fastener returned to a closed position.

Should the lining member 24 also become soiled, it can be detached from its associated panel member with ease, and can be rinsed off without difficulty and returned to its proper position. The same is true of the lining member 32.

It has been found in actual use of the colostomy belt that the belt has distinct advantages over belts of conventional design, in that a soiled absorption pad can be removed very easily, the colostomy belt remaining sanitary at all times while being worn.

Still further, it is believed to be an important characteristic of the invention that it is light and comfortable while being worn, and is particularly designed to receive an absorption pad of substantial thickness, while still preventing said pad from pressing against the adjacent portion of the wearer's body to such an extent as would make the wearer uncomfortable.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a colostomy belt, a pair of connected, flexible panels, one of which is adapted to extend across the abdomen of the body of a wearer and the other of which is adapted to extend partially around said body, said first named panel comprising a pair of separably joined panel members each of which is adapted to receive and hold against said body an absorption pad.

2. In a colostomy belt, a pair of connected, flexible panels, one of which is proportioned to extend across the front and one side of the body of a wearer, and the other of which is adapted to extend around the other side; means connecting said panels in spaced relation at opposite ends of the panels; and means dividing the first named panel into a pair of separably connected panel members each of which is adapted to receive and hold against the body a pad for the absorption of fecal matter.

3. In a colostomy belt, a pair of substantially rectangular panels of flexible material formed in different sizes, one of said panels being larger than the other and being of elongated formation so as to extend substantially fully across the abdomen of the body of a wearer and around one side of said body, the other panel being adapted to extend around the other side of said body, said first named panel comprising a pair of panel members one of which is approximately twice the size of the other, said panel members being separably connected intermediate the opposite ends of said first named panel and being respectively adapted to receive absorption pads and hold said pads against the wearer's body; and means connecting the opposite ends of the first named panel to the opposite ends of the second named panel.

4. In a colostomy belt, a pair of substantially rectangular panels of flexible material formed in different sizes, one of said panels being larger than the other and being of elongated formation so as to extend substantially fully across the abdomen of the body of a wearer and around one side of said body, the other panel being adapted to extend around the other side of said body, said first named panel comprising a pair of panel members one of which is approximately twice the size of the other, said panel members being separably connected intermediate the opposite ends of said first named panel and being respectively adapted to receive absorption pads and hold said pads against the wearer's body; means connecting the opposite ends of the first named panel to the opposite ends of the second named panel; and separable linings formed from a waterproof material and respectively connected to the inner surfaces of the panel members of the first named panel so as to be interposed between said panel members and absorption pads.

5. In a colostomy belt, a pair of substantially rectangular panels of flexible material formed in different sizes, one of said panels being larger than the other and being of elongated formation so as to extend substantially fully across the abdomen of the body of a wearer and around one side of said body, the other panel being adapted to extend around the other side of said body, said first named panel comprising a pair of panel members one of which is approximately twice the size of the other, said panel members being separably connected intermediate the opposite ends of said first named panel and being respectively adapted to receive absorption pads and hold said pads against the wearer's body; means connecting the opposite ends of the first named panel to the opposite ends of the second named panel; and separable linings formed from a waterproof material and respectively connected to the inner surfaces of the panel members of the first named panel so as to be interposed between said panel members and absorption pads, said panel members having darts extending inwardly from their top and bottom edges so as to impart a fullness to said panel members increasing their absorption pad retaining capacity.

LOIS S. MANN.

REFERENCES CITED

The following references are of record in the file of this patent:

UNITED STATES PATENTS

| Number | Name | Date |
| --- | --- | --- |
| 1,951,937 | Judd | Mar. 20, 1934 |
| 2,002,931 | Bowman | May 28, 1935 |
| 2,078,512 | Simpson | Apr. 27, 1937 |
| 2,476,513 | Scott | July 19, 1949 |
| 2,556,891 | Versoy et al. | June 12, 1951 |